United States Patent [19]

Adamson

[11] 4,364,491

[45] Dec. 21, 1982

[54] HORIZONTAL ICE CREAM CONE DISPENSER

[75] Inventor: Lee E. Adamson, Roscoe, Ill.

[73] Assignee: Beatrice Foods Co., Chicago, Ill.

[21] Appl. No.: 222,124

[22] Filed: Jan. 2, 1981

[51] Int. Cl.[3] .............................................. B65G 59/10

[52] U.S. Cl. .................................... 221/267; 221/279; 221/310

[58] Field of Search ............... 221/279, 303, 310, 227, 221/267

[56] References Cited

U.S. PATENT DOCUMENTS 2,261,880 11/1941 Hope .............................. 221/303 X 2,534,169 12/1950 Hope .............................. 221/310 X 2,834,647 5/1958 Hoban ............................. 221/227 X 2,893,596 7/1959 Gabrielsen ...................... 221/227 X 4,106,668 8/1978 Gebhardt ........................ 221/310 X

*Primary Examiner*—Allen N. Knowles

*Attorney, Agent, or Firm*—Vernon J. Pillote

[57] ABSTRACT

A horizontal cone dispenser adapted for dispensing fragile edible-type cones in which the stack of cones is supported in a horizontal stack tray for lengthwise movement toward a dispensing outlet having resilient cone retaining fingers for engaging the outer wall of the end cone in the stack to releasably retain end cone. The stack of cones is advanced toward the dispensing outlet by a follower that is urged horizontally toward the dispensing outlet with a low substantially constant-force provided by the coiled band constant-force springs. The stack tray is mounted in a horizontal drawer which can be pulled out to facilitate loading of the stack of cones.

8 Claims, 5 Drawing Figures

HORIZONTAL ICE CREAM CONE DISPENSER

BACKGROUND OF THE INVENTION

The edible-type cones used for ice cream including the so-called cake cones and sugar cones, are quite fragile. In order to minimize damage to such fragile edible-type cones, it is a common practice to provide an upright cone magazine having a dispensing outlet with resilient cone retaining fingers at the lower end of the stack for supporting the stack of cones in an upright position for gravity feed to the dispensing outlet. The edible-type cones are light weight and the overall weight of a verticle stack of such cones to be dispensed is relatively low and generally less than one pound. The resilient cone retaining fingers at the lower end of the vertical stack of cones only have to be made stiff enough to releasably retain the end cone in the stack with a low cone retaining force sufficient to support the weight of the stack of light weight cones. Thus, in the vertical-type edible cone dispensers, the end cone at the lower end of the stack can be manually grasped and withdrawn through the dispensing outlet without damaging the cone. While such vertical cone dispensers operate satisfactorily to dispense the fragile edible-type cones without damaging the cones, there are some installations where, because of space limitations and the like, the use of a vertical cone dispenser is not desired.

It has also been proposed to provide horizontal cup dispensers. The cup dispensers with which the applicant is aware utilize a horizontal cup guide having a dispensing outlet at one end with resilient cup engaging fingers around the dispensing outlet, and a coil-type compression spring in the horizontal guide for advancing the stack of cups toward the dispensing outlet. The cups are generally loaded into the guide by pushing them in a reverse direction through the resilient cup engaging fingers at the dispensing outlet while simultaneously compressing the spring in the guide. The force exerted by the compression spring increases with the length of the stack of cups and the resilient retaining fingers at the dispensing outlet must be selected to provide a sufficiently high cup retaining force to prevent ejecting of the cups when the dispenser is loaded with a full stack of cups and the spring is in its maximum compressed condition. Plastic and paper cups are relatively flexible and durable and can withstand the relatively high forces exerted on the stack by the coil-type compression spring and the correspondingly high cup retaining forces which must be exerted by the resilient cup retaining fingers on the end cup in such horizontal cup dispensers. However, when an attempt was made to dispense fragile edible-type cones in such a horizontal cup dispenser having a coil-type compression spring for advancing the stack of cones it was found that an undesirable amount of breaking, cracking, chipping and flaking occurred of the cones during loading and dispensing of the end cones.

SUMMARY OF THE INVENTION

An important object of the present invention is to provide a horizontal cone dispenser for fragile edible-type cones in which the force applied to the stack of cones to advance the cones to the dispensing outlet and the cone retaining forces applied to the end cone during withdrawal of the end cone, are sufficiently low to substantially prevent damage to the cones.

Another object of this invention is to provide a horizontal cone dispenser having an improved arrangement for facilitating loading of the stack of cones into the dispenser.

A more particular object of this invention is to provide a horizontal cone dispenser which is mounted in a drawer that is movable from a closed position in the housing to an extended position out of the housing to allow loading of the stack of cones onto the tray at the rear side of the dispensing opening.

Accordingly, the present invention provides a horizontal cone dispenser adapted for dispensing fragile edible-type cones which comprise a generally horizontal stack tray for guiding a nested stack of cones for movement along a generally horizontal path lengthwise of the stack, a dispensing outlet at one end of the stack tray having resilient cone engaging fingers around the dispensing outlet for engaging the outer wall of the end cone at one end of the stack and releasably retaining that end cone so that the end cone can be manually grasped and withdrawn through the dispensing outlet, means for advancing the stack of cones toward the dispensing outlet with a substantially constant force, said stack advancing means including a follower mounted for movement along the generally horizontal stack tray for engaging the other end of the stack, a coiled band constant-force type spring means operative when the coiled band is extended to provide a substantially constant linear resisting force tending to recoil the band, and means connecting the coiled portion of the constant-force type spring means to one of the items comprising the follower and the tray and the outer end of the band to the other of the items such that the band is extended when the follower is moved away from the dispensing outlet with the extended portion of the band generally paralleling the path of movement of the stack of cones along the stack tray, the constant-force type spring means being selected to provide a substantially constant force sufficient to advance a stack of cones to the dispensing outlet, the resilient cone engaging fingers being arranged to retain the end cone with a cone retaining force sufficient to prevent ejection of the end cone through the dispensing outlet when the stack is advanced by said constant-force type spring means.

The cone tray is advantageously mounted in a drawer supported for horizontal sliding movement in a housing between a closed position and an extended position to facilitate loading of the stack of cones in the tray.

Provision is also advantageously made for releasably retaining the follower in a loading position spaced from the dispensing outlet to facilitate loading of the stack of cones.

These, together with other objects, features and advantages of this invention will be more readily apparent from the following detailed description, taken in connection with the accompanying drawings wherein.

Figure 1:
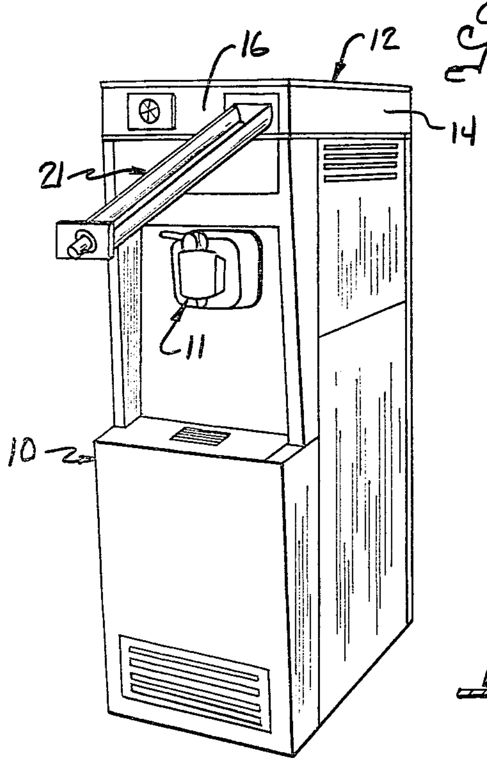
FIG. 1 is a perspective view of a soft ice cream dispensing machine having a horizontal cone dispenser of the present invention mounted thereon.

Referring first to FIG. 1 of the drawings, there is illustrated a soft-serve ice cream machine 10 having a valved dispensing outlet 11 which is selectably operable to dispense soft-serve ice cream into a cone or cup. Such soft-serve ice cream machines are frequently used in places where there is little or no space or clearance at the sides or in front of the machine for a vertical type cone dispenser. The present invention is directed to a horizontal cone dispenser adapted for dispensing fragile edible-type cones and is herein shown mounted in a hood 12 on the top of the soft-serve machine. The hood in general includes a top wall 13, side walls 14, a rear wall 15 and a front wall 16. The lower edges of the side, front and rear walls are adapted to overlap the top of the soft-serve machine 10 and flanges 18 (FIG. 2) are provided on the inner sides of the side walls 14 at a location spaced above the lower edges of the side walls to engage the top wall of the soft-serve machine and support the hood thereon. Fasteners can be provided for securing the hood in position on the top of the soft-serve machine.

Figure 5:
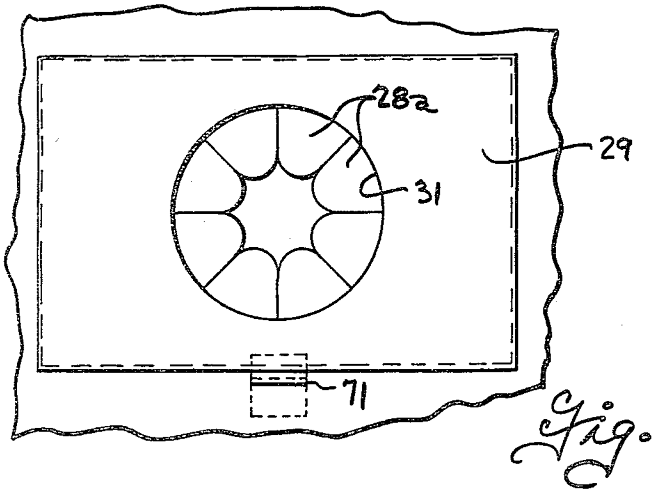
FIG. 5 is a fragmentary front elevational view of the horizontal cone dispenser.
Figures 2, 3:
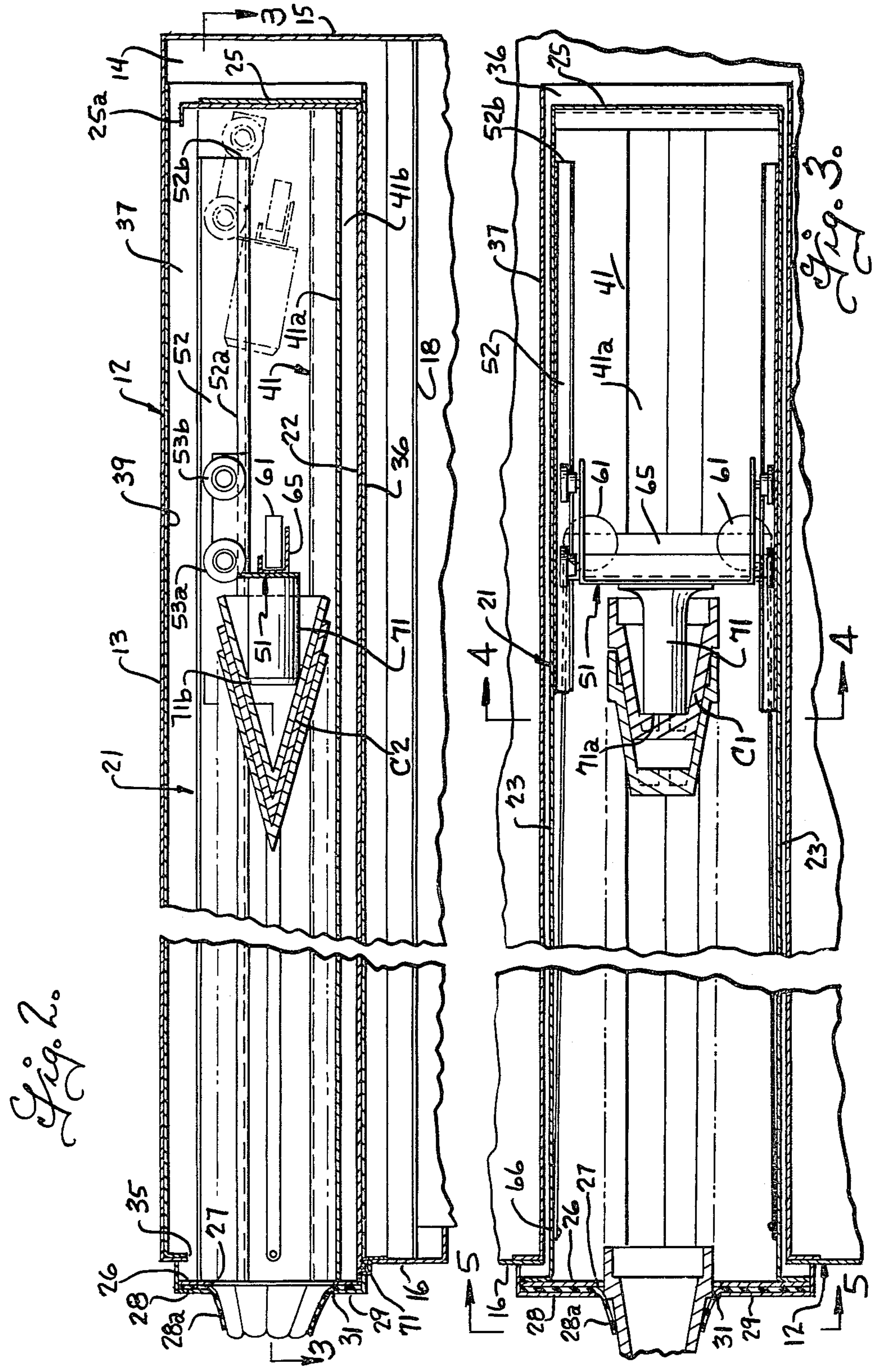
FIG. 2 is a fragmentary vertical sectional view through the horizontal cone dispenser.
FIG. 3 is a horizontal sectional view taken on the broken section line 3—3 of FIG. 2.

The horizontal cone dispenser is advantageously made in the form of a drawer 21 which is mounted for horizontal sliding movement in the hood 12 between a closed position in the hood and an extended position in which at least a major portion of the drawer 21 is disposed outside of the hood as shown in FIG. 1. The drawer includes a bottom wall 22, spaced side walls 23, a rear wall 25 and front wall 26. The front wall 26 has a dispensing opening 27 therein of a size to allow free passage of the cones therethrough and a rubber baffle 28 is clamped to the front plate 26 by a cover plate 29 having an opening 31 registering with the dispensing opening 27 in the front plate 26. The baffle member is formed of resilient and flexible material such as rubber or the like, and the baffle is centrally apertured and radially cut as best shown in FIG. 5 to provide a plurality of inwardly extending resilient cone engaging fingers 28*a*. The resilient cone engaging fingers 28*a* extend inwardly of the dispensing opening and engage the outer wall of the end cone in the stack to releasably retain the end cone against movement through the dispensing opening as shown in FIGS. 2 and 3. The projecting portion of the end cone 10 can be manually grasped to withdraw the end cone through the dispensing opening and the resilient fingers 28*a* then engage the outer walls of the next succeeding cone to retain that cone against withdrawal.

Figure 4:
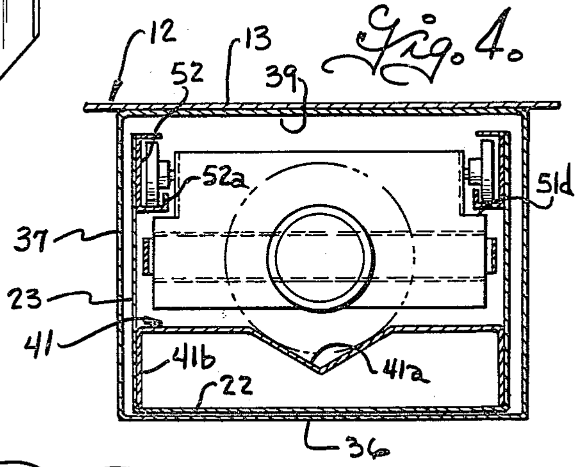
FIG. 4 is a transverse sectional view taken on the plane 4—4 of FIG. 3.

The front wall 16 of the hood has an opening 35 to allow passage of the drawer therethrough and drawer guides are provided in the hood for slidably supporting the drawer from movement between a retracted position as shown in FIGS. 2 and 3 and an extended position as shown in FIG. 1. In the embodiment illustrated, the drawer guides include a bottom wall 36, spaced side walls 37 and a top wall 39. A stack tray 41 is disposed in the drawer and has a longitudinally extending generally V-shaped trough 41*a* for guiding a nested stack of cones for movement along a horizontal path lengthwise of the stack and toward the dispensing opening 27. The tray 41 is conveniently loosely supported by depending legs 41*b* (FIG. 4) on the bottom wall of the drawer so that the tray can be removed for cleaning broken cone bits and crumbs that might break off from the cones and drop to the bottom of the drawer.

A follower or slide 51 for engaging the rear end of the stack of cones, is mounted for movement along the drawer. As shown, a pair of generally U-shaped tracks 52 are secured to the side walls 23 of the drawer adjacent the upper edge thereof and the follower is supported on each of the tracks by pairs of spaced rollers 53*a* and 53*b*. The follower 53*a* and 53*b* of each pair are spaced apart in a direction lengthwise of the track and the tracks each have an upwardly extending flange 52*a* on the lower edge to retain the rollers in their respective track.

In accordance with the present invention, provision is made for biasing the follower 51 along the stack tray with a relatively low substantially constant-force of the order of less than one pound so as to minimize damage or crushing of the cones when loading the stacks of cones. Use of such a low substantially constant-force for advancing the stack of cones horizontally toward the dispensing outlet also reduces the restraining force which must be exerted by the resilient fingers 28*a* on the end cone. The cone retaining fingers 28*a* are arranged to retain the end cone with a relatively low cone retaining force sufficient to prevent movement of the end cone through the dispensing outlet when the stack is advanced by the constant-force type springs. Thus, the resilient fingers do not damage the cones during withdrawal of the cones from the cone retaining fingers at the dispensing outlet. The substantially constant biasing force is provided by at least one and preferably two coiled band constant-force springs 61 such as are sold under the trademark "Conforce" by Vulcan Spring and Mfg. Co. Such constant-force springs are operative when the coiled band is extended to provide a substantially constant linear resisting force tending to recoil the band. In the embodiment shown, the coiled portion of the constant-force type springs are supported in a rearwardly opening generally U-shaped spring guide 65 attached to the follower 51, and the outer end of the band is attached as by a rivet or fastener 66 to the drawer or tray so that the band is extended when the follower 51 is moved away from the dispensing outlet 27, with the extended portion of the band generally paralleling the path of movement of the stack of cones along the stack tray. The constant-force type springs are selected to provide a substantially constant-force, the total of which is relatively low and of the order of one-half pound. The resilient cone retaining fingers 28*a* are arranged to apply a cone retaining force just sufficient to prevent ejection of the end cone through the cone retaining fingers when the stack of cones is advanced by said constant-force type spring means. The baffle 28 having resilient cone engaging fingers 28*a* can conveniently be same as used in vertical type dispensers for edible-type cones. As best shown in FIG. 2 constant-force spring 61 is mounted on the follower 51 and on the drawer so as to be disposed at a level adjacent the center line of the stack of cones.

Provision is advantageously made for releasably retaining the follower in a position spaced from the dispensing outlet at distance sufficient to allow loading of a stack of cones in front of the follower. As best shown in FIGS. 2 and 3, the rear ends of the tracks 52 are spaced forwardly from the rear walls and defined rearwardly facing abutment faces 52*b*. The follower is adapted to be moved to a position which the rear rollers 53*b* are rearwardly of the rear ends of the trackway and the follower can then be tilted to a position as shown in phantom in FIG. 2 in which the rear rollers engage the rear abutment face 52*b* on the trackway to releasably retain the follower in a retracted position. Abutments 51*d* (FIG. 4) on the follower are adapted to engage the underside of the trackway to limit tilting movement of the follower to a position as shown in FIG. 2. After the stack of cones has been loaded into the tray, the follower can be moved back to a generally horizontal position and the springs 61 will then bias the follower forwardly into engagement with the end cone in the stack.

In order to further minimize damage to the end cones in the stack, the follower 51 is provided with a cone engaging head 71 that extends forwardly from the follower. The cone engaging head 71 has an end face **71*a* adapted to engage the reinforced bottom of the frusto-conical cake type cones C1 shown in FIG. 3 so as to minimize damage to the rim of the end cone. The end of the cone engaging head 71 is also advantageously beveled as shown at 71*b* to engage the inner walls of the conical cake type cones C2 (FIG. 2**) at a location forwardly of their open ends and in a region where the end cone is reinforced by nesting engagement with adjacent cake cones.

In order to enhance access to the drawer when loading a stack of cones in the dispenser, provision is advantageously made to allow the drawer to be pulled to its fully extended position and the front of the drawer then lowered as shown in FIG. 1. As shown in FIG. 2, the rear end 25 of the drawer is provided with a forwardly extending abutment flange **25*a* that is spaced above the side walls of the drawer a distance greater than the height of the drawer opening 35 and which is arranged to engage the front wall 16 of the hood, when the drawer is in its fully extended position. The abutment 25*a* limits horizontal withdrawal of the drawer from the hood and the abutment is yet spaced below the top wall 39 of the drawer guide so that the drawer can tilt downwardly when it is moved to its fully extended position as shown in FIG. 1. This improves access to the drawer for loading and cleaning. A drawer latch 71 is provided on the front wall 16 of the hood or housing 12 and arranged to extend into an opening in the lower flange on the front drawer cover 29**, to releasably latch the drawer in its closed position. The drawer can be released from the latch by lifting the front of the drawer before pulling it out.

From the foregoing it is thought that the construction and operation of the horizontal cone dispenser will be readily understood. The drawer 21 can be drawn to its extended position and tilted downwardly as shown in FIG. 1, and the follower 51 can be moved to its retracted position and releasably retained in position as shown in phantom in FIG. 2. A stack of cones can then be deposited on the tray 41 in front of the follower and the follower thereafter released to allow the constant-force springs 61 to advance the follower into engagement with the cone at the rear end of the stack. The constant-force springs 61 exert a substantially constant biasing force on the follower, which force can be made relatively low of the order of one-half pound so as to substantially avoid crushing or damaging the fragile edible-type cones. Since the force exerted on the stack of cones by the constant-force spring is relatively low and substantially constant, the resilient cone retaining fingers **28*a* can also be made so as to exert only relatively low restraining force on the end cone, sufficient to prevent the end cone from moving out through the dispensing opening under the force exerted by constant-force springs 61**. Further, since the cone engaging head on the follower engages the cones forwardly of their open edge, damage to the end cones is further reduced.

The embodiments of the invention in which an exclusive property or privilege is claimed are defined as follows:

1. A horizontal cone dispenser adapted for dispensing fragile edible-type cones comprising, a generally horizontal stack tray for guiding a nested stack of the cones for movement along a generally horizontal path lengthwise of the stack, means defining a dispensing outlet at one end of the stack tray having resilient cone retaining fingers around the dispensing outlet for engaging the outer wall of the end cone at one end of the stack and releasably retaining that end cone so that the end cone can be manually grasped and withdrawn through the dispensing outlet, means for advancing a stack of cones toward the dispensing outlet with a substantially constant force, said stack advancing means including a follower mounted for movement along the generally horizontal stack tray for engaging the other end of the stack, a coiled band constant-force type spring means operative when the coiled band is extended to provide a substantially constant linear resisting force tending to recoil the band, means connecting the coiled portion of the constant-force type spring means to one of the items comprising the follower and tray and the outer end of the band to the other of said items such that the band is extended when the follower is moved away from the dispensing outlet with the extended portion of the band generally paralleling the path of movement of the stack of cones along the stack tray, the constant-force type spring means being selected to provide a substantially constant force which is sufficient to advance a stack of cones to the dispensing outlet, the resilient cone engaging means being arranged to retain the end cone with a cone retaining force sufficient to prevent ejection of the end cone through the dispensing outlet when the stack is advanced by said constant-force type spring means, the stack tray including first and second spaced side walls and first and second trackways extending lengthwise of the respective first and second side walls, the follower including first and second pairs of rollers engaging the respective first and second trackways at locations spaced apart longitudinally thereof.

2. A horizontal cone dispenser adapted for dispensing fragile edible-type cones comprising: a generally horizontal stack tray for guiding a nested stack of the cones for movement along a generally horizontal path lengthwise of the stack, means defining a dispensing outlet at one end of the stack tray having resilient cone retaining fingers around the dispensing outlet for engaging the outer wall of the end cone at one end of the stack and releasably retaining that end cone so that the end cone can be manually grasped and withdrawn through the dispensing outlet, means for advancing a stack of cones toward the dispensing outlet with a substantially constant force, said stack advancing means including a follower mounted for movement along the generally horizontal stack tray for engaging the other end of the stack, a coiled band constant-force type spring means operative when the coiled band is extended to provide a substantially constant linear resisting force tending to recoil the band, means connecting the coiled portion of the constant-force type spring means to one of the items comprising the follower and tray and the outer end of the band to the other of said items such that the band is extended when the follower is moved away from the dispensing outlet with the extended portion of the band generally paralleling the path of movement of the stack of cones along the stack tray, the constant-force type spring means being selected to provide a substantially constant force which is sufficient to advance a stack of cones to the dispensing outlet, the resilient cone engaging means being arranged to retain the end cone with a cone retaining force sufficient to prevent ejection of the end cone through the dispensing outlet when the stack is advanced by said constant-force type spring means, a housing having a drawer opening at a front side thereof, said stack tray including drawer means mounted in the housing for horizontal sliding movement between a closed position in the housing and an extended position in which at least a major part of the drawer means extends outwardly of the front side of the housing for loading of a stack of cones in said stack tray.

3. A cone dispenser according to claim 2 including means on the rear end of said drawer means engagable with said housing when the tray is extended to a position in which the rear end of the tray is adjacent the front side of the housing for retaining the extended tray in the housing with the tray inclined downwardly from the front side of the housing.

4. A cone dispenser according to claim 2 wherein the stack tray includes first and second spaced side walls and first and second trackways extending lengthwise of the respective first and second side walls, the follower including first and second pairs of rollers engaging the respective first and second trackways at locations spaced apart longitudinally thereof.

5. A cone dispenser according to claim 2 wherein the tray includes first and second spaced side walls and first and second trackways extending lengthwise of the respective first and second side walls at a level above said constant-force spring means, the follower including first and second pairs of rollers engaging the first and second trackways at locations spaced apart longitudinally thereof, the rear ends of the first and second trackways defining rear abutment faces, said follower bring adapted to be retracted to a position in which one roller of each pair is disposed rearwardly of the rear abutment faces and then tilted to a position in which said one roller of each pair engages the rear abutment surface to retain the follower in a retracted position for loading.

6. A cone dispenser according to claim 5 including means on the rear end of said drawer means engageable with said housing when the tray is extended to a position in which the rear end of the tray is adjacent the front side of the housing for retaining the extended tray in the housing with the tray inclined downwardly from the front side of the housing.

7. A horizontal cone dispenser adapted for dispensing fragile edible-type cones comprising, a generally horizontal stack tray for guiding a nested stack of the cones for movement along a generally horizontal path lengthwise of the stack, means defining a dispensing outlet at one end of the stack tray having resilient cone retaining fingers around the dispensing outlet for engaging the outer wall of the end cone at one end of the stack and releasably retaining that end cone so that the end cone can be manually grasped and withdrawn through the dispensing outlet, means for advancing a stack of cones toward the dispensing outlet with a substantially constant force, said stack advancing means including a follower mounted for movement along the generally horizontal stack tray for engaging the other end of the stack, a coiled band constant-force type spring means operative when the coiled band is extended to provide a substantially constant linear resisting force tending to recoil the band, means connecting the coiled portion of the constant-force type spring means to one of the items comprising the follower and tray and the outer end of the band to the other of said items such that the band is extended when the follower is moved away from the dispensing outlet with the extended portion of the band generally paralleling the path of movement of the stack of cones along the stack tray, the constant-force type spring means being selected to provide a substantially constant force which is sufficient to advance a stack of cones to the dispensing outlet, the resilient cone engaging means being arranged to retain the end cone with a cone retaining force sufficient to prevent ejection of the end cone through the dispensing outlet when the stack is advanced by said constant-force type spring means, said constant-force type spring means including two constant-force type springs arranged so that the extended portions of their bands are horizontally offset from opposite sides of the stack of cones on the stack tray and at a level adjacent the centerline of the stack of cones, the stack tray including first and second spaced side walls and first and second trackways extending lengthwise of the respective first and second side walls at a level above said constant-force springs, the follower including first and second pairs of rollers engaging the first and second trackways at locations spaced apart longitudinally thereof.

8. A cone dispenser according to claim 7 wherein the rear ends of the first and second trackways define rear abutment faces, said follower being adapted to be retracted to a position in which one roller of each pair is disposed rearwardly of the rear abutment faces and then tilted to a position in which said one roller of each pair engages the rear abutment surface to retain the follower in a retracted position for loading.

* * * * *